(No Model.)
F. E. KOHLER.
TRANSPLANTER AND POST HOLE DIGGER.
No. 281,194. Patented July 10, 1883.
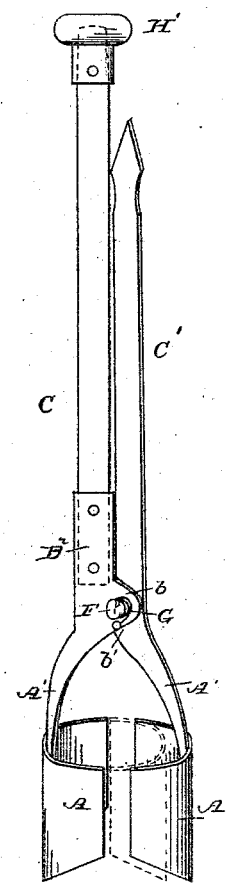
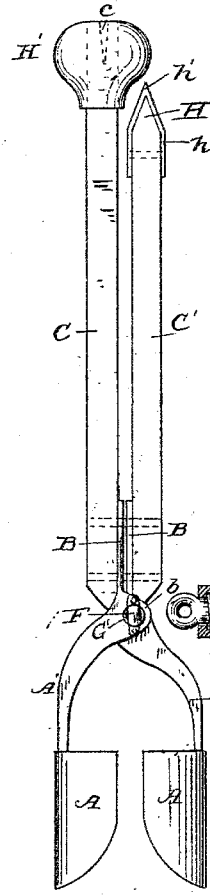
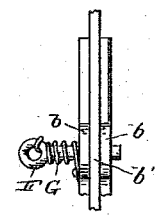
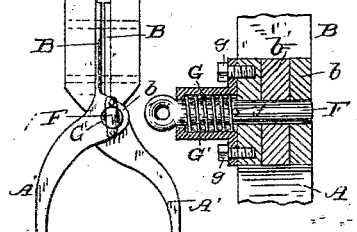
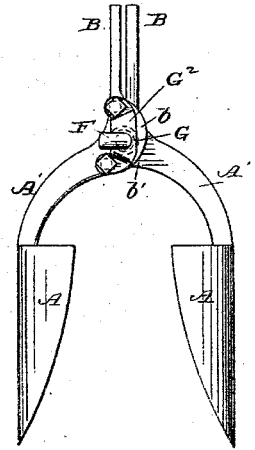
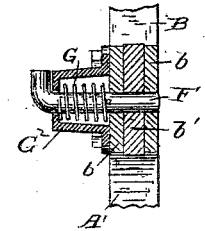
Witnesses:
N. N. Low
A. J. Houghton
Inventor:
Frederick E. Kohler
by Doubleday & Bliss
Attys

UNITED STATES PATENT OFFICE.

FREDERICK E. KOHLER, OF CANTON, OHIO, ASSIGNOR OF ONE-HALF TO ISAAC HARTER, OF SAME PLACE.

TRANSPLANTER AND POST-HOLE DIGGER.

SPECIFICATION forming part of Letters Patent No. 281,194, dated July 10, 1883.

Application filed January 13, 1883. (No model.)

*To all whom it may concern:*

Be it known that I, FREDERICK E. KOHLER, a citizen of the United States, residing at Canton, in the county of Stark and State of Ohio, have invented certain new and useful Improvements in Transplanters and Post-Hole Diggers, of which the following is a specification, reference being had therein to the accompanying drawings.

The object of this invention is to provide an improved implement of a simple character by means of which can be readily performed the operations of digging post or other holes, and of which one of the parts can be separately used for the purpose of loosening stones or other obstructions in the ground, and the same or the other part can be similarly used in packing the soil in the holes or other places.

Figure 1 is a side elevation of an implement constructed with my improvements. Fig. 2 is an edge view of a portion of the same. Figs. 3 and 4 show modified forms. Figs. 5 and 6 are edge views of portions of the implements shown in Figs. 3 and 4.

In the drawings, A A represent the shovels or spade portions of the implement, they being preferably of the shape shown—that is to say, concavo-convex—though they may be of any suitable character. With each of the shovels there is formed, or to it there is rigidly attached, an arm or bar, A', terminating at the upper end in a plate, as at B. One of these arms is provided with inwardly-projecting ears, as at b, and between these ears there is loosely fitted the ear b' of the other arm, A'. These ears are pivotally connected together by a pin, F, in such manner that the shovels can be swung toward and from each other.

To the plates B handles, of wood or other suitable material, are fitted and bolted, as at C C', though, if desired, the arms A' A' may be extended upward and made as long as the handles themselves; or one of the handles may be made of wood and secured to its plate B, and the other may be made of a continuous piece of metal. One of the handles is at the upper end shaped suitably to permit its being used for loosening stones or other obstructions that may be met with in the ground. I prefer to form thus the upper end of the shorter handle, C'—that is, I taper the sides at the upper end to a comparatively sharp point, as shown at H, and then I rivet or otherwise secure thereto a flat steel point, h, this being made of a band or strip of flat steel welded at the center to form a sharp strong point, h'. This produces an implement of substantially the character of a crow-bar. It may be at this part somewhat wider than at the point below, though for most purposes I have found the proportions shown to be advantageous. The other handle, C, is at the upper end provided with a device for packing the earth. Preferably it consists of a piece of metal, H', having an aperture extending through it, by means of which it can be fitted and fastened to the upper end of the handle, there being a wedge at c to crowd the wood against the wall of the aperture. This part can be cast in the form of a flattened ball to probably the greatest advantage.

In order to use the parts of the implement separately for the purposes above indicated, it becomes desirable to have them instantly separable, though at the same time it is necessary to have them fastened firmly when they are to be used together. To attain these ends I prolong the pin F somewhat and combine therewith a coiled spring, G, having one end secured to or arranged to bear against some stationary part of the implement, and having its other end fastened to or arranged to bear against the pivot-pin F. The spring tends to hold the pin in position; but, as will be readily seen, it can be instantly withdrawn to allow the handles to be separated. After being separated, either one of the parts can be used as a shovel or a spade; or the part A A' C' can be used for loosening stones or soil, and the part A A' C can be used for packing the earth when again filling the hole. When it is required to again join the parts together, it is only necessary to partially withdraw the pin F, insert the ear b' between the ears b, and then allow the spring to again force the pin through the ears.

In Fig. 1 I have shown the spring G as being mounted and concealed within a socket-piece or abutment, G', which is fastened by screws g, or otherwise, suitably to one of the parts of the implement. f is a pin passing through the pin F, to provide a bearing for the inner end of the spring. In Fig. 3 I have shown a modification of this concealing and retaining device, it consisting of a loop or stirrup, G², having an aperture through which passes the pin F, the spring operating within the loop in the same manner as in the socket-piece G' in Figs. 1 and 2. In Figs. 4 and 5 there is shown a construction in which one of the arms A' is, at the upper end, provided with a socket, B², in which the lower end of the handle C is fitted and secured. The parts A' C', as shown here, consist of a continuous piece of metal pivoted between the ears b'. In this case the pin F is fastened at one end directly to the side of one of the ears b' and secured to an eye in the pin F. The packing or ramming device H' may be secured on the handle in the manner shown in this figure—that is to say, by a pin instead of a wedge.

Heretofore post-hole diggers of the class to which my invention appertains have been generally made in two parts, united with a "scissers-joint"—that is to say, the handles have been crossed and pivoted together. When so constructed, the handles are apart when the shovels are being inserted into the earth, and therefore it is necessary for the operator to use both hands, and generally a fastening device is required to properly space the handles while being driven into the ground. Moreover, it is difficult with a scissors-joint to give a bearing on both sides of either or both of the pivoted parts, and as a result the parts are often strained or bent. When these implements are made as mine is, the handles lie close together when the shovels are being inserted, and they can be both grasped by both hands of the operator, and no spacing or fastening devices are required. The pivoted part b' has a bearing on both sides, it being situated between the ears or jaws b b.

I am aware of the fact that in devices of an analogous character use has been heretofore made of two swinging shovels joined together by a pivotal connection other than that known as the "scissors-joint"—that is to say, of such character that the handles are nearest together when the shovels are apart; but in the devices last above alluded to the shovels have been connected to the handles by means of arms or bars extending upward on substantially straight lines, and therefore it has been necessary to have inward extensions from the handles for the purpose of providing a bearing for the connecting-pivot. This has made it impossible to bring the handles into such proximity as that, while being inserted in the ground, they could both be grasped together by the hands of the operator. I arrange the handles so as to be situated substantially over the center of the shovel portion, and connect them suitably with the shovels, this relative arrangement of the handles enabling me to bring them close together throughout their entire length (or a sufficient portion of it) when the shovels are being inserted. I prefer to connect the handles and the shovels by curved bars of substantially the character shown.

I am aware of the fact that transplanting implements have been heretofore made with handles arranged to oscillate in the same plane, there being one or more ears projecting from each handle toward the other to provide a pivotal support; but these devices have been arranged, as said, for transplanting, and therefore have not needed that disposition of the parts relative to each other which I have devised, and which is necessary for making a successful post-hole digger of the class to which my invention pertains. In the transplanting implements alluded to the pivot has been placed so far up and the handles have been so far apart that when brought together at their upper ends the shovel portions are swung outwardly until they are inclined outwardly and downwardly—that is, are carried away from positions of parallelism. This is objectionable in post-hole diggers, and I overcome this difficulty by so disposing the handles, the shovels, and the pivot that a positive abutment is provided for the handles above the pivot when the shovels have moved together far enough to bring the shovels into parallelism, the abutting of the handles against each other stopping the shovels at this point and preventing them from swinging away from the parallel lines.

I do not herein claim any of the features shown in my application now pending, numbered 88,883, filed March 20, 1883, except those features which are hereinafter set forth in the claims, reserving the right to claim in said application all the other matters therein shown and not herein claimed.

I do not wish to be limited to this specific form of devices shown for holding the pivot-pin, nor to the exact construction of the arms A' and the handles C C', as these parts can be varied without departing from the other parts of the invention.

What I claim is—

1. In a post-hole digger, the combination of the swinging shovels, the handles attached to the shovels, the sliding pin by which the handles are detachably pivoted together, and the spring for holding said pin in place, substantially as set forth.

2. In a post-hole digger, the combination of the handles, the pivot-pin which joins the handles together, the coiled spring G, the retainer or abutment for the spring, provided with an aperture for the passage of the pivot-pin, the retaining device and the pin being permanently attached to one handle, substantially as set forth.

3. The herein-described tool, it having the oppositely-arranged shovels, whereby the earth may be grasped and removed from the post-hole, the handles respectively attached thereto, the pivot-pin, the spring arranged to permit the handles to be separated from each other, and the stamping device secured to the end of one handle, the other handle being sharpened or shod to form a crow-bar, substantially as set forth.

4. In a post-hole digger, the combination of the swinging shovels, the handles arranged centrally over the shovels, the ear $b'$, carried by one of said handles, and the two ears or jaws $b\ b$, carried by the other, and arranged one upon one side and the other upon the other of the ear $b'$, and the pivot which passes through the three ears, whereby a lateral support is given upon both sides of the ear $b'$, substantially as set forth.

In testimony whereof I affix my signature in presence of two witnesses.

FREDERICK E. KOHLER.

Witnesses:
  JOHN T. BROWN,
  JAMES J. GRANT.